July 15, 1958
A. VOZZA
2,843,845
INDICATOR DISPLAY
Filed July 6, 1955
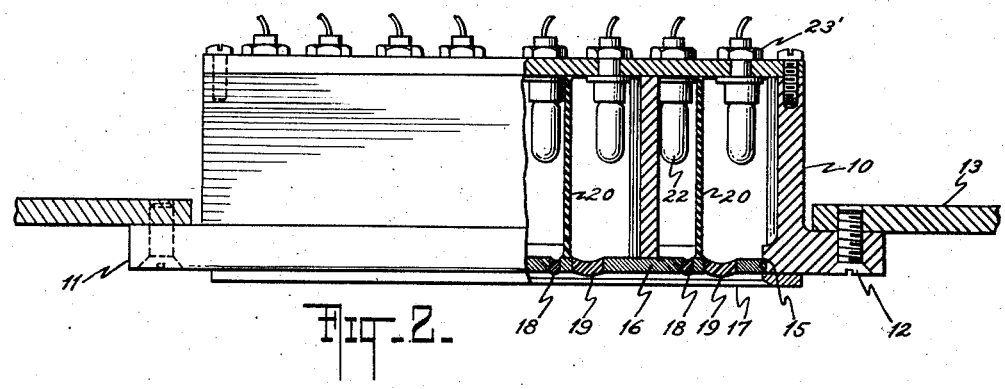
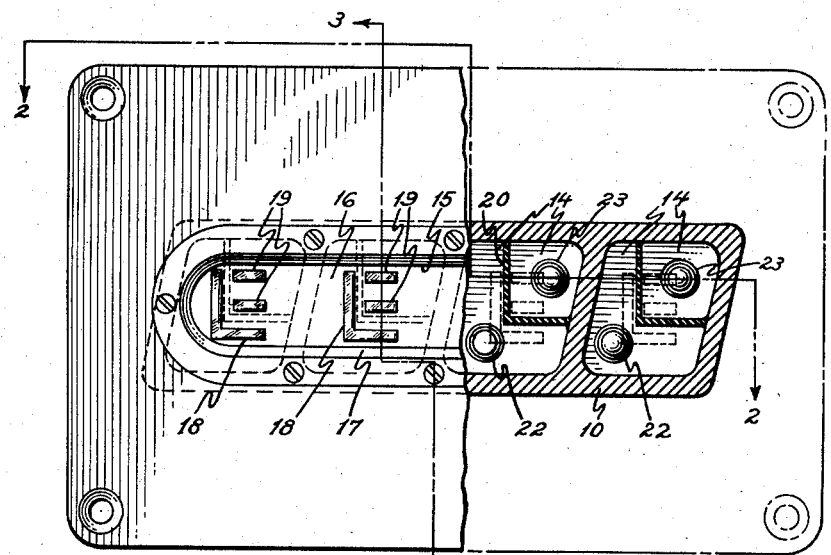
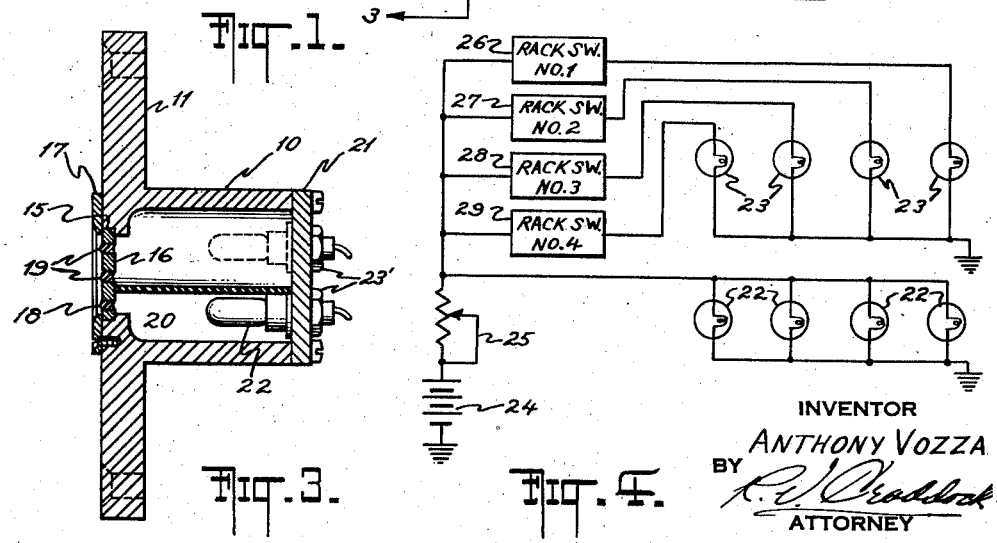
INVENTOR
ANTHONY VOZZA
BY
ATTORNEY United States Patent Office 2,843,845
Patented July 15, 1958

2,843,845
INDICATOR DISPLAY

Anthony Vozza, Bergenfield, N. J., assignor to Sperry Rand Corporation, a corporation of Delaware Application July 6, 1955, Serial No. 520,234

4 Claims. (Cl. 340—378)

The present invention relates generally to indicator displays and more particularly to an indicator for indicating a plurality of different conditions which may be represented respectively by a plurality of different characters such as letters, numerals and the like.

While the indicator of the present invention may find application in any of a number of systems where it is desired to indicate the operating characteristics or conditions of a number of devices therein, it will be herein described with particular reference to an aircraft equipped with, for example, bombs, missiles, or rockets. In such applications, the pilot can determine by observing the indicator whether the bomb or rocket racks are loaded or are empty.

Many prior indicators for supplying such information utilized solenoid actuated indicator flags which were rendered visible or invisible to the pilot upon release of the bombs or rockets. However, such flag type indicators were of necessity rather large and in many cases, due to space limitations, the indicator flags were overlapped behind the indicator panel. Thus in order to overlap the indicator flags they had to be placed at different depths or levels with respect to the face of the indicator which produced not only an undesirable parallax effect when viewed from an angle, but also presented a difficult lighting problem. Furthermore, these flag type indicators were relatively expensive to manufacture due to the high cost of the solenoids, and also were difficult to assemble. Another disadvantage of such flag type indicators was poor visibility when viewed at acute angles. They also required considerable electrical power to operate thereby producing heat dissipation problems.

It is therefore a principal object of the present invention to provide a novel indicator which overcomes all of the above problems and disadvantages.

Another object of the present invention resides in the provision of a condition-responsive indicator wherein the conditions to be indicated are representable by a number of different characters. Each character is visibly formed by selectively illuminating or rendering visible predetermined groups of character elements which are so relatively arranged that when one group is illuminated a particular character is formed and when another group is illuminated the elements of the latter group combine with the previously illuminated group to form another and different character, and so on.

Other objects and advantages of the present invention not at this time particularly enumerated will become apparent from the following detailed description of a preferred embodiment of the present invention when read in the light of the accompanying drawings, wherein:

Fig. 1 is a front elevation view partly in section of the indicator;

Fig. 2 is a plan view thereof partly in section, taken at about the plane defined by lines 2—2 of Fig. 1;

Fig. 3 is a vertical section of the indicator taken at about the planes defined by line 3—3 of Fig. 1; and Fig. 4 is an electrical wiring diagram of the indicator.

Referring now to Figs. 1, 2 and 3, the indicator housing is represented generally by reference character 10 having a mounting flange 11 which is adapted to be secured, as by means of screws or studs 12, at any suitable location on the aircraft instrument panel 13. As shown more clearly in the sectionized portion of Fig. 1, the housing 10 is cellular, i. e. it is provided with a plurality of cells 14 the function of which will become apparent below. Although the housing may be formed by any convenient sheet metal method, it is preferable that it is cast to thereby simplify assembly. Any suitable casting material such as Bakelite or aluminum or plastic may be used. The front of the housing 10 is provided with an elongated opening 15 into which is fitted a face plate 16 suitably held in position by means of a clamping ring or bezel 17.

In the illustrated embodiment of the indicator of the present invention it is desired to indicate whether four rocket launching racks are loaded or are empty. Thus, two distinct conditions are to be represented, and in this embodiment these conditions are represented respectively by the letters "L" and "E." These two letters may be formed as illustrated by means of a group of character elements 18, arranged to form the letter "L" to which are added another group of character elements, i. e., two relatively spaced horizontal elements 19, which when illuminated together with the "L" elements 18 form the letter "E." Thus by separately illuminating these two groups of character elements the letters "L" and "E" may be formed.

The face plate 15 is preferably fabricated from metal or other suitable opaque material into which the character elements are carved, etched or otherwise delineated. It will be noted that a small space is provided between the groups of character elements 18 and 19 for purposes to be hereinafter described. Each character of the indicator is so located on the front plate 16 that it falls generally centrally of the cells 14 of housing 10. Also, after the character elements have been cut out of face plate 16 they are filled with any suitable translucent material such as for example with a thermosetting plastic resin. It will be understood that this resin may be colored in any desired color usually red or some other prominent color.

In order that each group of indicating elements of the characters may be separately illuminated, the housing cells 14 are formed with partitions 20, these partitions extending over the entire depth of the housing 10 (see Figs. 2 and 3) and are so shaped at their forward end that they fit or actually touch the rear surface of face plate 16 to thereby provide a light-tight seal. If desired, the front surface or edge of partitions 20 may be coated with a suitable opaque cement in order to render the joint perfectly light-tight. The shape of partitions 20 is of course determined by the number and relative position of the groups of character elements with relation to the other groups of character elements. In the embodiment illustrated, the partition is L-shaped so as to separate the character elements 18 defining the letter "L" from the character element groups 19 which transform the letter "L" into the letter "E."

Although, in the illustrated embodiment of the invention, the partitions 20 are illustrated as being fabricated from separate pieces with respect to the housing 10 it will be understood that all the partitions and walls may be integrally molded or cast as a single unit thereby further simplifying assembly of the indicator. In either case each cell defined by the housing walls form a means for separating the character elements into predetermined groups, each separate group being separately illuminated, Furthermore, each cell is opened adjacent the face of the housing so that when the face plate 16 is in place the desired indicating groups of character elements lie over their respective cells.

For separately illuminating the various groups of character elements, a rear cover plate 21 is provided with openings into which suitable illuminating devices or means such as small bulbs 22 which are fitted and secured therein as by means of nuts 23. Each bulb is so located on the rear plate 21 that with the plate 21 is place the bulbs extend into each separate cell.

When the lower group of bulbs 22 in Fig. 1 are illuminated, the character elements 18 are rendered visible, that is, the letter "L" is seen by the pilot thereby indicating that the rocket racks are loaded. The upper group of bulbs 23 when illuminated, render visible the group of character elements 19 thereby transforming the previously visible "L" into an "E" indicating to the pilot that the rocket or missile racks are empty.

In Fig. 4 there is illustrated a schematic wiring diagram of the indicator of the present invention. In the illustrated embodiment the lower group of bulbs 22 are constantly illuminated as by means of a suitable source of electrical energy such as by battery 24. A dimming potentiometer 25 may be provided for adjusting the brilliancy of the indicator under varying ambient light conditions. The upper group of bulbs 23 are each connected in series with suitable switches 26, 27, 28, 29, associated respectively with a corresponding rocket or missile launching rack. These switches may be simple single-pole single-throw switches which are normally opened when the missile or bomb is in its rack and which is closed upon release of the missile. Thus, as the missiles are launched their respective switches will be closed thereby energizing their respective bulbs 23 and illuminate the respective character elements which transform the "L" into an "E" indicating that the rack is empty.

It will be noted that the bulbs 22 are always lit. This is a safety or fail-safe feature of the indicator of the present invention since if a failure occurs in the missile rack it is possible to get a loaded indication when the racks are actually emptied but on the other hand it is impossible to get an empty indication when the racks are in fact loaded.

Thus I have provided a novel condition indicator which is charcterized by its extreme perceptability in the cockpit. Further, there is no parallax problems since the letters are located substantially at the surface of the indicator face, thereby allowing the instrument to be accurately viewed from very acute sighting angles. Also, there is provided a novel condition-indicating instrument for indicating a plurality of different conditions which is easy to fabricate and is relatively inexpenisve.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An indicator for indicating a plurality of different conditions representable respectively by a plurality of different characters each different character having character elements in common with the other characters, an indicator face having said character elements separately delineated thereon and so relatively spaced and arranged as to cooperate to form a plurality of different characters when predetermined groups of said elements are rendered visible, means for separating said common elements into predetermined, cooperable groups, each separate group adding and eliminating elements from the previously visible group to form said different characters, means associated with each of said groups of elements for rendering the same visible, and means controlled in accordance with a condition to be indicated for operating said last-mentioned means whereby to form the character representative thereof.

2. An indicator for indicating a plurality of different conditions representable respectively by a plurality of different characters each different character having character elements in common with the other characters, an indicator housing having a face and exterior and interior wall portions, a plurality of separate openings in said face defining said common character elements, said element openings being so relatively juxtaposed that they form a plurality of different characters when predetermined groups thereof are rendered visible and said wall portions defining a plurality of cells, each cell being open adjacent said housing face and each cell separating said common character elements into predetermined groups, each separate group adding and eliminating elements from the previously visible group to form different characters, means within each cell for rendering the character element groups associated therewith visible, and means controlled in accordance with a condition to be indicated for operating said last-mentioned means whereby to form the character representative thereof.

3. An indicator of the character set forth in claim 2, wherein the means for rendering said element visible comprises illuminating means and wherein said operating means comprises circuit means responsive to the condition to be indicated for energizing said illuminating means.

4. An indicator of the character set forth in claim 2, wherein each of said element-defining openings in said housing face is filled with a translucent material whereby to form a seal for each of said cells but to allow said elements to be rendered visible.

References Cited in the file of this patent
UNITED STATES PATENTS

| | | |
|---|---|---|
| 2,462,781 | Schoenbaum | Feb. 22, 1949 |
| 2,557,396 | Snell | June 19, 1951 |